(12) United States Patent
Kim et al.

(10) Patent No.: US 12,001,349 B2
(45) Date of Patent: Jun. 4, 2024

(54) STORAGE DEVICE INCLUDING REGIONS OF DIFFERENT DENSITIES AND OPERATION METHOD THEREOF

(71) Applicant: Samsung Electronics Co., Ltd., Suwon-si (KR)

(72) Inventors: Chanha Kim, Hwaseong-si (KR); Gyeongmin Nam, Seoul (KR); Seungryong Jang, Yangpyeong-gun (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/853,227

(22) Filed: Jun. 29, 2022

(65) Prior Publication Data

US 2023/0126807 A1   Apr. 27, 2023

(30) Foreign Application Priority Data

Oct. 26, 2021  (KR) ........................ 10-2021-0143295

(51) Int. Cl.
| | | |
|---|---|---|
| *G06F 12/14* | (2006.01) | |
| *G06F 12/0882* | (2016.01) | |
| *G06F 12/123* | (2016.01) | |

(52) U.S. Cl.
CPC ........ *G06F 12/145* (2013.01); *G06F 12/0882* (2013.01); *G06F 12/123* (2013.01)

(58) Field of Classification Search
CPC ............. G06F 12/0246; G06F 12/0882; G06F 12/123; G06F 12/145; G06F 2212/7202; G06F 2212/7203; G06F 2212/7204
See application file for complete search history.

(56) References Cited

U.S. PATENT DOCUMENTS

| | | |
|---|---|---|
| 7,679,133 B2 | 3/2010 | Son et al. |
| 8,553,466 B2 | 10/2013 | Han et al. |
| 8,559,235 B2 | 10/2013 | Yoon et al. |
| 8,654,587 B2 | 2/2014 | Yoon et al. |
| 9,025,376 B2 | 5/2015 | Ryu |

(Continued)

OTHER PUBLICATIONS

Extended European Search Report dated Mar. 28, 2023 issued in corresponding European Appln. No. 22198036.0.

*Primary Examiner* — Aracelis Ruiz
(74) *Attorney, Agent, or Firm* — Harness, Dickey & Pierce, P.L.C.

(57) ABSTRACT

A storage device includes a memory device including a first memory region having a lowest bit density, a second memory region having a medium bit density, and a third memory region having a highest bit density, and a controller configured to control the memory device. The controller is configured to determine data from a host as being any one of hot data, warm data and cold data, is configured to store the hot data in the first memory region, is configured to store the warm data in the second memory region, is configured to store the cold data in the third memory region, is configured to select a source block of first memory blocks included in the first memory region, is configured to select destination blocks in each of the second and third memory regions, and is configured to migrate each piece of unit data stored in the source block to one of the destination blocks according to a degree of hotness of each piece of the unit data.

19 Claims, 13 Drawing Sheets

(56) References Cited

U.S. PATENT DOCUMENTS

| | | | |
|---|---|---|---|
| 9,176,864 B2 | 11/2015 | Gorobets et al. | |
| 9,304,905 B2 | 4/2016 | Kwon et al. | |
| 9,329,789 B1 * | 5/2016 | Chu | G06F 12/0246 |
| 9,665,291 B2 | 5/2017 | Lin et al. | |
| 9,715,445 B2 | 7/2017 | Ravimohan et al. | |
| 10,055,140 B2 | 8/2018 | Hsu | |
| 10,168,917 B2 | 1/2019 | Dai et al. | |
| 10,198,318 B2 | 2/2019 | Oikawa et al. | |
| 10,372,342 B2 * | 8/2019 | Dusija | G06F 3/061 |
| 10,380,018 B2 | 8/2019 | Muchherla et al. | |
| 10,606,503 B2 | 3/2020 | Mio et al. | |
| 10,854,290 B1 | 12/2020 | Wu et al. | |
| 11,042,307 B1 * | 6/2021 | Li | G06F 3/064 |
| 2011/0233648 A1 | 9/2011 | Seol et al. | |
| 2014/0337566 A1 * | 11/2014 | Oh | G06F 3/0659 |
| | | | 711/103 |
| 2018/0032275 A1 | 2/2018 | Pahwa et al. | |
| 2018/0373428 A1 * | 12/2018 | Kan | G06F 3/0616 |
| 2019/0042154 A1 * | 2/2019 | Gaewsky | G06F 3/068 |
| 2019/0095116 A1 | 3/2019 | Igahara et al. | |
| 2019/0102083 A1 | 4/2019 | Dusija et al. | |
| 2019/0196963 A1 | 6/2019 | Byun | |
| 2019/0377494 A1 | 12/2019 | Rao et al. | |
| 2019/0377681 A1 * | 12/2019 | Hodes | G06F 12/0848 |
| 2020/0174668 A1 | 6/2020 | Byun | |
| 2022/0004495 A1 * | 1/2022 | Natarajan | G06F 3/0604 |

\* cited by examiner

First Memory Block

|  | S1 | S2 | S3 | S4 |
|---|---|---|---|---|
| Page1 | | | | |
| Page2 | | | | |
| Page3 | | | | |
| Page4 | | | | |
| Page5 | | | | |
| Page6 | | | | |
| Page7 | | | | |
| Page8 | | | | |

FIG. 6

Logical Address List

| Index | 1 | 2 | 3 | 4 | 5 | 6 | 7 | 8 | 9 | 10 |
|---|---|---|---|---|---|---|---|---|---|---|
| | A | B | C | D | E | A | B | D | A | D |
| Weight | 0.2 | 0.4 | 0.6 | 0.8 | 1.0 | 1.2 | 1.4 | 1.6 | 1.8 | 2.0 |

STORAGE DEVICE INCLUDING REGIONS OF DIFFERENT DENSITIES AND OPERATION METHOD THEREOF

CROSS-REFERENCE TO RELATED APPLICATION(S)

This application claims the benefit under 35 USC 119(a) of Korean Patent Application No. 10-2021-0143295 filed on Oct. 26, 2021 in the Korean Intellectual Property Office, the entire disclosure of which is incorporated herein by reference for all purposes.

BACKGROUND

The present inventive concepts relate to a storage device and an operating method thereof.

A computer system may include various types of memory systems, and the memory system may include a memory and/or a controller. A memory device is used to store data, and is classified as a volatile memory device or a non-volatile memory device. A non-volatile memory device may include memory regions having different bit densities, write speeds and/or lifespans of these memory regions may be different from each other.

SUMMARY

Example embodiments provide components and operations related to a storage device for dividing and storing data having different attributes in memory regions having different bit densities.

Example embodiments also provide a storage device in which a decrease in lifespans of memory regions may be alleviated when data migration is performed between memory regions having different bit densities in order to secure extra space within a memory region.

According to example embodiments, a storage device includes a memory device including a first memory region having a lowest bit density, a second memory region having a medium bit density, and a third memory region having a highest bit density, and a controller controlling the memory device. The controller is configured to determine data from a host as being any one of hot data, warm data and cold data based on a degree of hotness of the data, is configured to store the hot data in the first memory region, is configured to store the warm data in the second memory region, is configured to store the cold data in the third memory region, is configured to select a source block of first memory blocks included in the first memory region, is configured to select destination blocks in each of the second and third memory regions, and is configured to migrate each piece of unit data stored in the source block to the destination blocks of the second or third memory regions according to a degree of hotness of each piece of the unit data.

According to example embodiments, a storage device includes a memory device including a first memory region having a lowest bit density, a second memory region having a medium bit density, and a third memory region having a highest bit density, and a controller controlling the memory device. The controller is configured to divide and store data from a host in the first to third memory regions according to a hotness of the data, is configured to determine candidate blocks among first memory blocks included in the first memory region based on valid page counts (VPCs) or programmed times of the first memory blocks, is configured to select a source block based on hotnesses of plural pieces of unit data stored in the candidate blocks, is configured to select destination blocks in the second and third memory regions, and is configured to migrate each piece of unit data stored in the source block to the destination blocks of the second and third memory regions according to a degree of hotness of each piece of the unit data.

According to example embodiments, an operating method of a storage device including a first memory region having a lowest bit density, a second memory region having a medium bit density, and a third memory region having a highest bit density includes determining candidate blocks among first memory blocks included in the first memory region based on valid page counts (VPCs) or programmed times of the first memory blocks, selecting a source block based on hotnesses of plural pieces of unit data stored in the candidate blocks, selecting destination blocks in the second and third memory regions, and migrating each piece of unit data stored in the source block to the destination blocks of the second or third memory regions according to a degree of hotness of each piece of the unit data.

BRIEF DESCRIPTION OF DRAWINGS

The above and other aspects, features, and advantages of the present inventive concepts will be more clearly understood from the following detailed description, taken in conjunction with the accompanying drawings, in which:

FIG. 6 is a diagram illustrating a relationship between a memory block and unit data;

FIG. 7 is a diagram illustrating an example of a method of determining a hotness for each logical address by a hotness determiner;

DETAILED DESCRIPTION

Hereinafter, example embodiments will be described with reference to the accompanying drawings.

Figure 1:
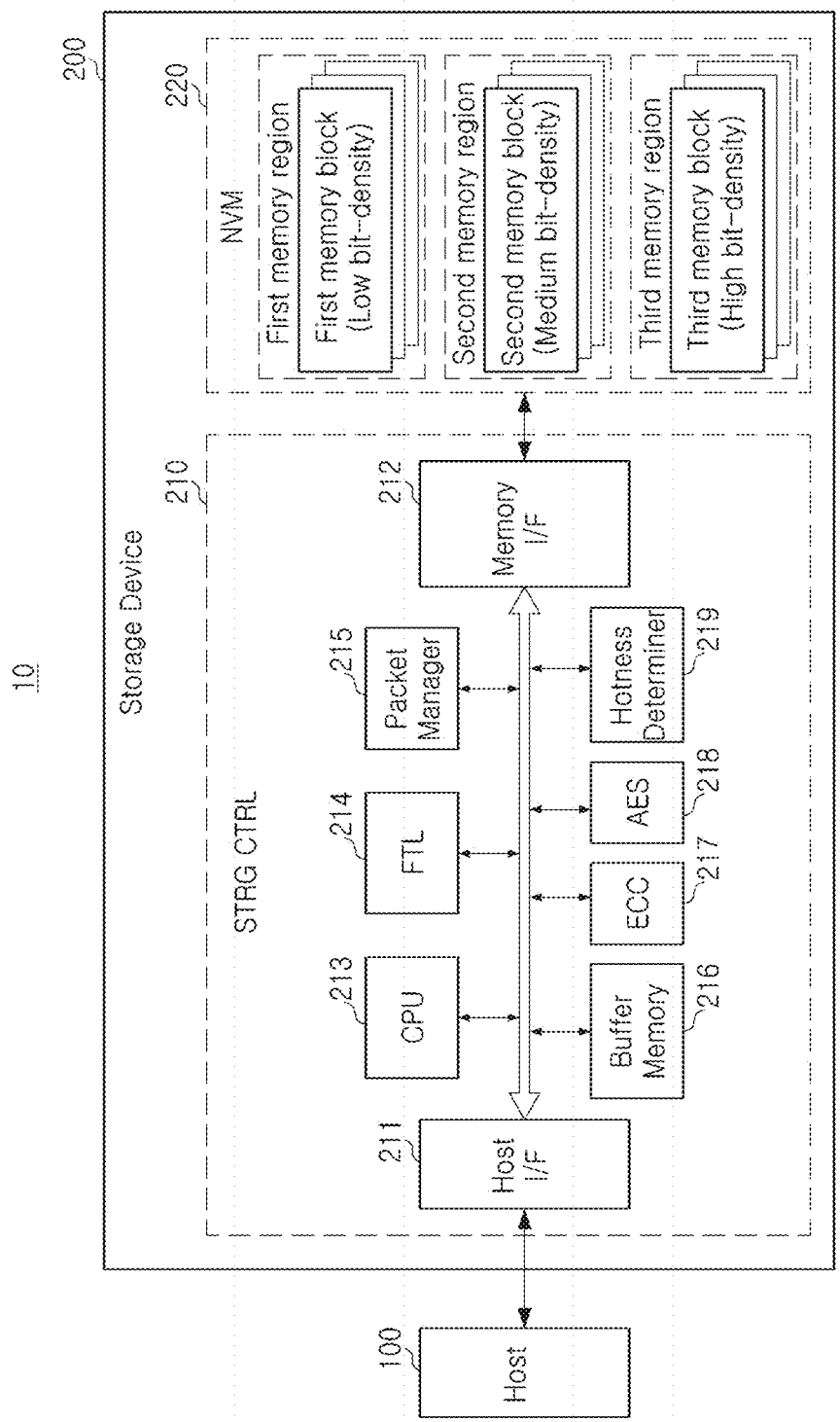
FIG. 1 is a block diagram illustrating a host-storage system according to example embodiments.

FIG. 1 is a block diagram illustrating a host-storage system according to example embodiments.

A host-storage system 10 may include a host 100 and/or a storage device 200. In addition, the storage device 200 may include a storage controller 210 and/or a non-volatile memory (NVM) 220.

The host 100 may include electronic devices, for example, mobile electronic devices such as mobile phones, MP3 players, and laptop computers, or electronic devices such as desktop computers, game machines, televisions (TVs), and projectors. The host 100 may include at least one operating system (OS). The operating system may generally manage and control functions and operations of the host 100.

The storage device 200 may include storage media for storing data according to a request from the host 100. As an example, the storage device 200 may include at least one of a solid state drive (SSD), an embedded memory, and a removable external memory. When the storage device 200 is the SSD, the storage device 200 may be a device conforming to a non-volatile memory express (NVMe) standard. When the storage device 200 is the embedded memory or the external memory, the storage device 200 may be a device conforming to a universal flash storage (UFS) or embedded multi-media card (eMMC) standard. Each of the host 100 and the storage device 200 may generate and transmit a packet according to an adopted standard protocol.

The non-volatile memory 220 may maintain stored data even though power is not supplied thereto. The non-volatile memory 220 may store data provided from the host 100 through a programming operation, and may output data stored in the non-volatile memory 220 through a read operation. The non-volatile memory 220 may include a plurality of memory blocks, each of which may include a plurality of pages, each of which may include a plurality of memory cells connected to a word line. In example embodiments, the non-volatile memory 220 may be a flash memory.

When the non-volatile memory 220 of the storage device 200 includes a flash memory, the flash memory may include a 2D NAND memory array or a 3D (or vertical) NAND (VNAND) memory array. As another example, the storage device 200 may include various other types of non-volatile memories. For example, the storage device 200 may include a magnetic random access memory (MRAM), a Spin-Transfer Torque MRAM, a conductive bridging RAM (CBRAM), a ferroelectric RAM (FeRAM), a phase RAM (PRAM), a resistive RAM, and various other types of memories.

The storage controller 210 may include a host interface 211, a memory interface 212, and/or a central processing unit (CPU) 213. In addition, the storage controller 210 may further include a flash translation layer (FTL) 214, a packet manager 215, a buffer memory 216, an error correction code (ECC) engine 217, an advanced encryption standard (AES) engine 218, and/or a hotness determiner 219. The storage controller 210 may further include a working memory (not illustrated) to which the flash translation layer (FTL) 214 is loaded, and data write and read operations for the non-volatile memory 220 may be controlled by the CPU 213 executing the flash translation layer 214.

The host interface 211 may transmit and receive packets to and from the host 100. The packet transmitted from the host 100 to the host interface 211 may include a command, data to be written to the non-volatile memory 220, or the like, and the packet transmitted from the host interface 211 to the host 100 may include a response to the command, data read from the non-volatile memory 220, or the like.

The memory interface 212 may transmit data to be written to the non-volatile memory 220 to the non-volatile memory 220 or may receive data read from the non-volatile memory 220. Such a memory interface 212 may be implemented to comply with a standard protocol such as a toggle or an Open NAND Flash Interface (ONFI).

The flash translation layer 214 may perform several functions such as address mapping, wear-leveling, and/or garbage collection. The address mapping is an operation of converting a logical address received from the host 100 into a physical address used to actually store data in the non-volatile memory 220. The wear-leveling is a technology for reducing or preventing excessive deterioration of a specific block by allowing blocks in the non-volatile memory 220 to be uniformly used, and may be implemented through, for example, a firmware technology of balancing erase counts of physical blocks. The garbage collection is a technology for securing a usable capacity in the non-volatile memory 220 in a manner of copying valid data of a block to a new block and then erasing an existing block.

The packet manager 215 may generate a packet according to a protocol of an interface negotiated with the host 100 or parse various information from a packet received from the host 100. In addition, the buffer memory 216 may temporarily store data to be written to the non-volatile memory 220 or data to be read from the non-volatile memory 220. The buffer memory 216 may be provided in the storage controller 210, but may also be disposed outside the storage controller 210.

The ECC engine 217 may perform an error detection and correction function for read data read from the non-volatile memory 220. For example, the ECC engine 217 may generate parity bits for write data to be written into the non-volatile memory 220, and the parity bits generated as described above may be stored in the non-volatile memory 220 together with the write data. At the time of reading data from the non-volatile memory 220, the ECC engine 217 may correct an error of read data using the parity bits read from the non-volatile memory 220 together with the read data, and output the read data of which the error is corrected.

The AES engine 218 may perform at least one of an encryption operation and a decryption operation for data input to the storage controller 210 using a symmetric-key algorithm.

The hotness determiner 219 may determine a hotness of data received from the host 100. The hotness may refer to a numerical value indexing an access frequency of unit data. A piece of unit data may correspond to a logical address. For example, the logical address may be a logical block address (LBA) used in a file system of the host 100.

The hotness determiner 219 may determine a hotness for each logical address based on an access frequency, recency and the like of each of the logical addresses. Data may be classified into hot data, which is frequently accessed data, warm data, which is data accessed at a medium frequency, or cold data, which is infrequently accessed data, according to a hotness of a corresponding logical address.

In an example of FIG. 1, the hotness determiner 219 may be implemented as a hardware device separate from the CPU 213. However, example embodiments are not limited thereto. For example, the hotness determiner 219 may be implemented as firmware, and when the hotness determiner 219 is implemented as the firmware, the firmware may be loaded into the working memory and driven by the CPU 213.

The non-volatile memory 220 may include first to third memory regions. The first to third memory regions may include memory blocks having different bit densities. The bit density of the memory block may refer to the number of data bits that a memory cell included in the corresponding memory block may store.

The memory blocks included in the first memory region may be referred to as first memory blocks, the memory blocks included in the second memory region may be referred to as second memory blocks, and the memory blocks included in the third memory region may be referred to as third memory blocks. In an example of FIG. 1, the first memory blocks may be memory blocks having the lowest bit density, the third memory blocks may be memory blocks having the highest bit density, and the second memory blocks may be memory blocks having a medium bit density. That is, the number of bits that may be stored in one memory cell may increase in the order of the first memory blocks, the second memory blocks, and the third memory blocks.

The memory blocks having the different bit densities may have different attributes. For example, the third memory blocks may provide the greatest storage capacity among the memory blocks, and the first memory blocks may have the fastest access speed and the longest lifespan among the memory blocks. The second memory blocks may have a medium storage capacity, access speed, and lifetime.

When data having different attributes may be divided and stored in the memory blocks having the different attributes, the non-volatile memory 220 may be efficiently used. For example, when the hot data, the frequently accessed data, is stored in the first memory blocks, an access speed of the hot data may be improved, and average performance of the storage device 200 may be improved. When the cold data, the relatively infrequently accessed data, is stored in the third memory blocks, the data stored in the third memory block may be infrequently updated, and a decrease in lifespan of the third memory blocks may be alleviated.

The storage controller 210 may divide and store the data received from the host 100 in the first to third memory regions according to the hotness thereof. In addition, when extra space within a certain memory region becomes insufficient, the storage controller 210 may migrate data stored in the corresponding memory region to another memory region. A memory block in which data to be migrated is stored may be referred to as a source block, and a memory block corresponding to a destination to which the data is to be migrated may be referred to as a destination block.

The memory block may be worn out when a programming operation and an erase operation are repeatedly performed. An operation of migrating the data from the source block to the destination block may be accompanied by an operation of erasing the source block and an operation of programming the destination block. Accordingly, the operation of migrating the data may cause a decrease in lifespan of the non-volatile memory 220. When data is migrated between memory regions having various bit densities, a method capable of alleviating a decrease in lifetime of the memory regions may be required.

According to example embodiments, the storage device may select the source block and the destination block so that the data may be divided and stored in the memory regions according to the hotness of the data when migrating the data. When the data is divided and stored in the memory regions according to the hotness, the decrease in the lifespan of the memory regions due to the data migration in the storage device 200 may be alleviated.

Memory blocks having different attributes included in the non-volatile memory 220 will hereinafter be described in more detail with reference to FIGS. 2 to 4 before describing an operation of the storage device 200 according to example embodiments.

Figure 2:
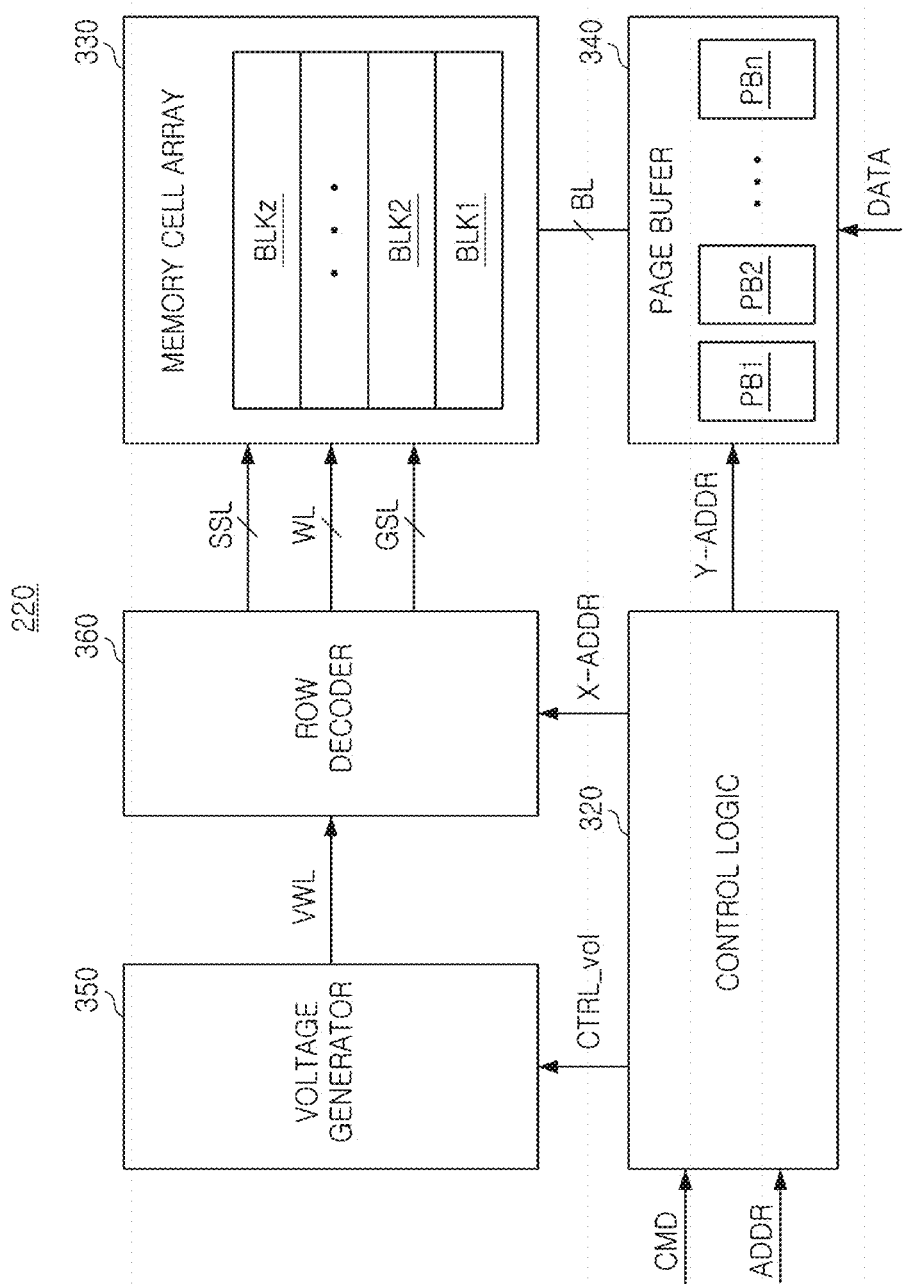
FIGS. 2 to 4 are diagrams illustrating memory blocks included in a non-volatile memory in greater detail.

FIG. 2 is an example block diagram illustrating a memory device. Referring to FIG. 2, a memory device 300 may include a control logic circuit 320, a memory cell array 330, a page buffer 340, a voltage generator 350, and/or a row decoder 360. Although not illustrated in FIG. 2, the memory device 300 may further include the memory interface circuit, and may further include a column logic, a pre-decoder, a temperature sensor, a command decoder, an address decoder, and/or the like.

The control logic circuit 320 may generally control various operations within the memory device 300. The control logic circuit 320 may output various control signals in response to a command CMD and/or an address ADDR from the memory interface circuit. For example, the control logic circuit 320 may output a voltage control signal CTRL_vol, a row address X-ADDR, and a column address Y-ADDR.

The memory cell array 330 may include a plurality of memory blocks BLK1 to BLKz (z is a positive integer), each of which may include a plurality of memory cells. The memory cell array 330 may be connected to the page buffer 340 through bit lines BL, and may be connected to the row decoder 360 through word lines WL, string selection lines SSL, and ground selection lines GSL.

In example embodiments, the memory cell array 330 may include a three-dimensional (3D) memory cell array, and the 3D memory cell array may include a plurality of NAND strings. Each NAND string may include memory cells each connected to word lines vertically stacked on a substrate. U.S. Pat. Nos. 7,679,133, 8,553,466, 8,654,587, 8,559,235, and U.S. Patent Application Publication No. 2011/0233648 are herein incorporated by reference. In example embodiments, the memory cell array 330 may include a two-dimensional (2D) memory cell array, and the 2D memory cell array may include a plurality of NAND strings arranged along row and column directions.

The page buffer 340 may include a plurality of page buffers PB1 to PBn (n is an integer of 3 or more), and the plurality of page buffers PB1 to PBn may be connected to the memory cells through a plurality of bit lines BL, respectively. The page buffer 340 may select at least one of the bit lines BL in response to the column address Y-ADDR. The page buffer 340 may operate as a write driver or a sense amplifier according to an operation mode. For example, at the time of a programming operation, the page buffer 340 may apply a bit line voltage corresponding to data to be programmed to the selected bit line. At the time of a read operation, the page buffer 340 may sense a current or a voltage of the selected bit line to sense data stored in the memory cell.

The voltage generator 350 may generate various types of voltages for performing program, read, and erase operations based on the voltage control signal CTRL_vol. For example, the voltage generator 350 may generate a program voltage, a read voltage, a program verification voltage, an erase voltage, and/or the like, as word line voltages VWL.

The row decoder 360 may select one of a plurality of word lines WL and may select one of a plurality of string selection lines SSL, in response to the row address X-ADDR. For example, the row decoder 360 may apply the program voltage and the program verification voltage to the selected word line at the time of the programming operation, and may apply the read voltage to the selected word line at the time of the read operation.

Figure 3:
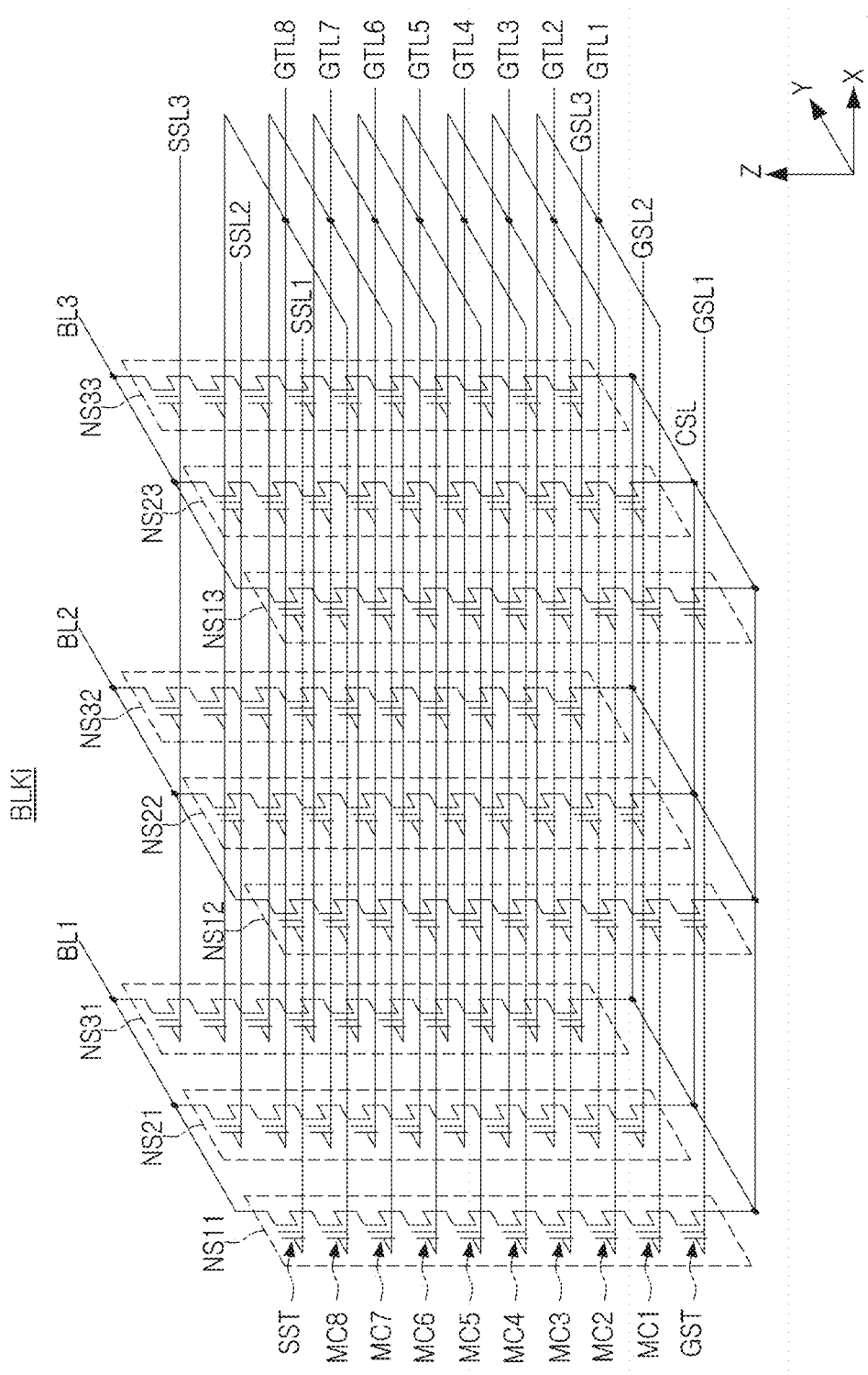

FIG. 3 is a diagram illustrating a 3D V-NAND structure that may be applied to the storage device according to example embodiments. When a non-volatile memory of the storage device is implemented as a 3D V-NAND-type flash memory, each of a plurality of memory blocks constituting the non-volatile memory may be represented by an equivalent circuit as illustrated in FIG. 3.

A memory block BLKi illustrated in FIG. 3 is a three-dimensional memory block formed in a three-dimensional structure on a substrate. For example, a plurality of memory NAND strings included in the memory block BLKi may be formed in a direction perpendicular to the substrate.

Referring to FIG. 3, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. It has been illustrated in FIG. 3 that each of the plurality of memory NAND strings NS11 to NS33 includes eight memory cells MC1, MC2, . . . , MC8, but example embodiments are not necessarily limited thereto.

The string selection transistors SST may be connected to corresponding string selection lines SSL1, SSL2, and SSL3. The plurality of memory cells MC1, MC2, . . . , MC8 may be connected to corresponding gate lines GTL1, GTL2, . . . , GTL8, respectively. The gate lines GTL1, GTL2, . . . , GTL8 may correspond to word lines, and some of the gate lines GTL1, GTL2, . . . , GTL8 may correspond to dummy word lines. The ground selection transistors GST may be connected to corresponding ground selection lines GSL1, GSL2, and GSL3. The string selection transistors SST may be connected to corresponding bit lines BL1, BL2, and BL3, and the ground selection transistors GST may be connected to the common source line CSL.

Word lines (for example, WL1) having the same height may be connected in common, and the ground selection lines GSL1, GSL2, and GSL3 and the string selection lines SSL1, SSL2, and SSL3 may be separated from each other, respectively. It has been illustrated in FIG. 3 that the memory block BLKi is connected to eight gate lines GTL1, GTL2, . . . , GTL8 and three bit lines BL1, BL2, and BL3, but example embodiments are not necessarily limited thereto.

The memory block BLK may have different bit densities depending on the number of bits stored in the memory cells included in the memory block BLK.

Figure 4:
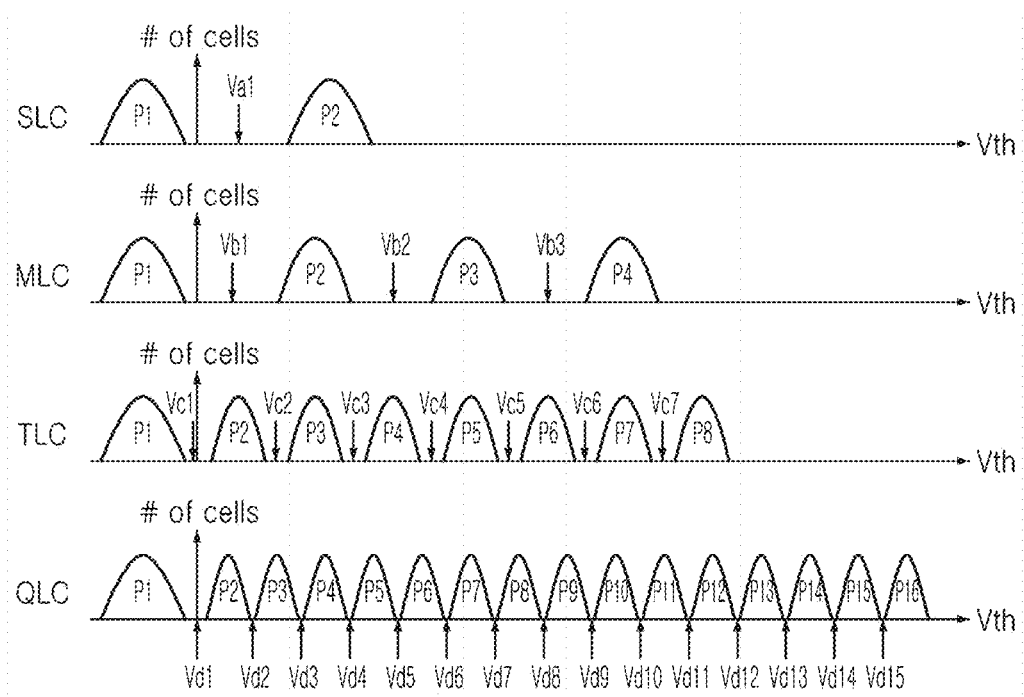

FIG. 4 is a graphs illustrating threshold voltage distributions depending on the number of bits stored in a memory cell.

Referring to FIG. 4, in each graph, a horizontal axis indicates a magnitude of a threshold voltage, and a vertical axis indicates the number of memory cells.

When the memory cell is a single level cell (SLC) storing 1-bit data, the memory cell may have a threshold voltage corresponding to any one of a first program state P1 and a second program state P2. A read voltage Val may be a voltage for distinguishing the first program state P1 and the second program state P2 from each other. The memory cell having the first program state P1 has a threshold voltage lower than the read voltage Val, and may thus be read as an on-cell. The memory cell having the second program state P2 has a threshold voltage higher than the read voltage Val, and may thus be read as an off-cell.

When the memory cell is a multiple level cell (MLC) storing 2-bit data, the memory cell may have a threshold voltage corresponding to any one of first to fourth program states P1 to P4. First to third read voltages Vb1 to Vb3 may be read voltages for distinguishing the first to fourth program states P1 to P4 from each other. The first read voltage Vb1 may be a read voltage for distinguishing the first program state P1 and the second program state P2 from each other. The second read voltage Vb2 may be a read voltage for distinguishing the second program state P2 and the third program state P3 from each other. The third read voltage Vb3 may be a read voltage for distinguishing the third program state P3 and the fourth program state P4 from each other.

When the memory cell is a triple level cell (TLC) storing 3-bit data, the memory cell may have a threshold voltage corresponding to any one of first to eighth program states P1 to P8. First to seventh read voltages Vc1 to Vc7 may be read voltages for distinguishing the first to eighth program states P1 to P8 from each other. The first read voltage Vc1 may be a read voltage for distinguishing the first program state P1 and the second program state P2 from each other. The second read voltage Vc2 may be a read voltage for distinguishing the second program state P2 and the third program state P3 from each other. In a similar manner, the seventh read voltage Vc7 may be a read voltage for distinguishing the seventh program state P7 and the eighth program state P8 from each other.

When the memory cell is a quadruple level cell (QLC) storing 4-bit data, the memory cell may have any one of first to sixteenth program states P1 to P16. First to fifteenth read voltages Vd1 to Vd15 may be read voltages for distinguishing the first to sixteenth program states P1 to P16 from each other. The first read voltage Vd1 may be a read voltage for distinguishing the first program state P1 and the second program state P2 from each other. The second read voltage Vd2 may be a read voltage for distinguishing the second program state P2 and the third program state P3 from each other. In a similar manner, the fifteenth read voltage Vd15 may be a read voltage for distinguishing the fifteenth program state P15 and the sixteenth program state P16 from each other.

As a bit density of a memory block increases, the number of program states formed in memory cells of the memory block and the number of read voltages for distinguishing the respective program states from each other may increase. Accordingly, as the bit density of the memory block increases, a programming operation time may increase in order to form the respective program states and a read operation time may increase in order to distinguish the respective program states from each other, and thus, an access speed may decrease.

When a programming operation and an erase operation are repeated in the memory block, the memory cells may be deteriorated. When the memory cells are deteriorated, it may become more difficult to precisely program each program state of the memory cells. As the bit density of the memory block increases, each program state needs to be more delicately programmed in the memory block. Accordingly, as the bit density of the memory block increases, a lifespan of the memory block may end at fewer erase counts.

In order to utilize advantages of each of the memory blocks having the different bit densities, the storage device 200 may include memory regions including the memory blocks having the different bit densities. For example, the storage device 200 may include a third memory region having a great size in order to provide a greater storage capacity, and may include first and second memory regions having a smaller size than the third memory region in order to complement an access speed of the third memory region. According to an implementation, the first memory region may include SLC memory blocks, the second memory region may include TLC memory blocks, and the third memory region may include QLC memory blocks.

According to the related art, various methods for migrating data within one memory region or between different memory regions in order to utilize a space of the non-volatile memory more efficiently 220 have been known. For example, there is a method of selecting the coldest data stored in an SLC memory region and migrating the coldest data to a destination block of an MLC memory region, a method of distinguishing hot data and cold data from each other within a source block and dividing and storing the hot data in several destination blocks, a method of migrating data to a destination block in the same memory region or a destination block in another memory region based on a time elapsing since data has been written in the source block, and/or the like.

However, when the coldest data in the SLC memory region needs to be selected in order to migrate the data according to the related art, a hotness of each of all pieces of unit data stored in the SLC memory region needs to be determined, and thus, a computation amount of the storage controller 210 may increase. In addition, when the destination block is selected according to the related art, there is a limitation that it is difficult to divide and store hot data and cold data mixed in the source block in different memory regions.

According to example embodiments, the storage device 200 may decrease a computation amount for selecting the source block by selecting candidate blocks among the memory blocks included in the first memory region and selecting the source block based on hotnesses of plural pieces of unit data stored in each of the candidate blocks.

In addition, the storage device 200 may alleviate a decrease in lifespan of the memory regions by classifying plural pieces of unit data stored in the source block of the first memory region according to the hotness and dividing and storing the each piece of unit data in a destination block of the second memory region and or destination block of the third memory region.

A storage device and an operating method thereof according to example embodiments will hereinafter be described in more detail with reference to FIGS. 5 to 12.

Figure 5:
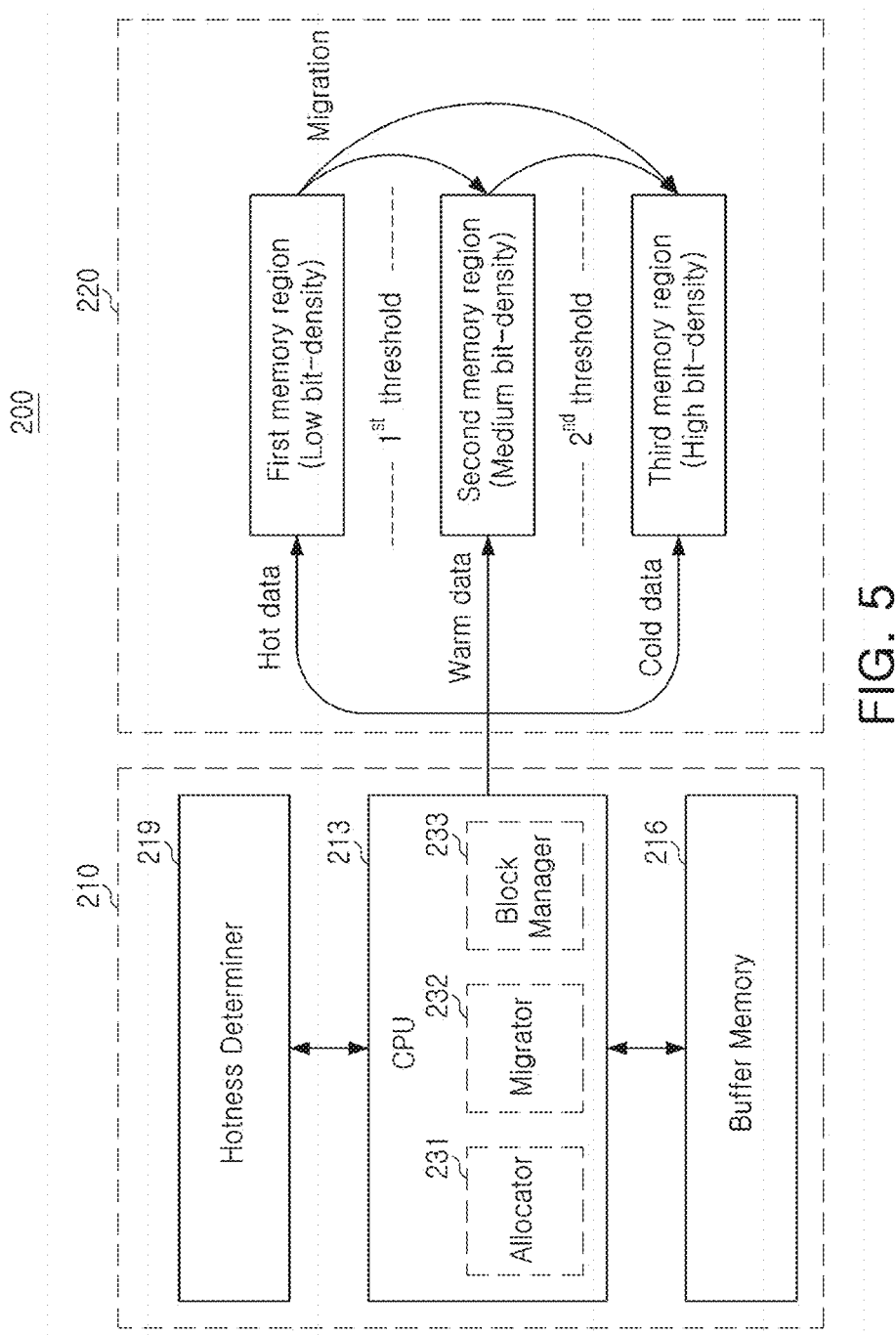
FIG. 5 is a schematic block diagram illustrating components of a storage device described with reference to FIG. 1.

FIG. 5 is a schematic block diagram illustrating the CPU 213, the buffer memory 216, the hotness determiner 219, and first to third memory regions having different bit densities, of the storage device 200 described with reference to FIG. 1.

The storage device 200 may include memory blocks having various bit densities. The first memory region may include first memory blocks having the lowest bit density, the second memory region may include second memory blocks having a medium bit density, and the third memory region may include third memory blocks having the highest bit density.

The memory block may store plural pieces of unit data. Each piece of the unit data may correspond to a logical address.

FIG. 6 is a diagram illustrating a relationship between a memory block and unit data by taking an example where the first memory block is the SLC memory block as an example. Blanks illustrated in the first memory block of FIG. 6 indicate regions capable of storing a piece of unit data, respectively. As described with reference to FIG. 3, the memory block may include a plurality of pages. In an example of FIG. 6, the first memory block may include eight pages Page 1 to Page 8. According to an implementation, one page may store plural pieces of unit data. For example, one page may store four pieces of unit data. In an example of FIG. 6, each region storing a piece of unit data in one page of the memory block may be divided into first to fourth sectors S1 to S4.

An example embodiment where one page stores plural pieces of unit data has been described by way of example in FIG. 6, but example embodiments are not limited thereto. For example, one page may store a piece of unit data or two or more pages may store a piece of unit data.

Referring to FIG. 5 again, the hotness determiner 219 may determine a hotness of data. The hotness may be determined for each piece of unit data. The hotness determiner 219 may determine a hotness for each logical address based on a pattern in which logical addresses are received from the host 100. The hotness for each logical address may correspond to the hotness of a piece of unit data corresponding to the logical address.

FIG. 7 is a diagram illustrating an example of a method of determining a hotness for each logical address by a hotness determiner.

FIG. 7 illustrates a logical address list including a predetermined or alternatively, desired number of entries. The logical address list may store a predetermined or alternatively, desired number of recently received logical addresses. For example, the logical address list may include ten entries. Symbols A, B, C, D, and E indicated in the entries of the logical address list indicate different logical addresses. Indices indicated above the entries indicate the order in which the logical addresses are received from the host. For example, a logical address that is first received may be 'A', and a logical address that is tenth received may be 'D'.

The hotness determiner 219 may determine a hotness for each logical address based on reception frequencies and recency of the logical addresses. For example, the hotness determiner 219 may determine the hotness for each logical address by counting the number of each of the logical addresses A, B, C, D, and E in the logical address list. In order to reflect the recency of the logical address in the hotness of the logical address, the hotness determiner 219 may assign a higher weight to a recently received logical address when counting the hotness of the logical address. FIG. 7 illustrates an example embodiment where a weight of a last received logical address is 2.0, which is the highest, and a weight monotonically decreases by 0.2 whenever a logical address is received, such that a weight decreases as the order in which the logical address is received becomes older. For example, a hotness of the logical address 'A' may be 3.2 (=0.2+1.2+1.8).

A workload pattern of the host may change over time, and the hotness for each logical address may change depending on the workload pattern.

Referring to FIG. 5 again, the CPU 213 may drive an allocator 231, a migrator 232, and/or a block manager 233. The allocator 231, the migrator 232, and/or the block manager 233 may be loaded into the working memory (not illustrated) and driven by the CPU 213. For example, the allocator 231, the migrator 232, and/or the block manager 233 may be included in the flash conversion layer 214 described with reference to FIG. 1.

The allocator 231 may allocate the data received from the host 100 to any one of the first to third memory regions. For example, the host 100 may provide a logical address of data to be written to the storage device 200 while providing a write command and the data to be written to the storage device 200. The allocator 231 may request the hotness of the logical address from the hotness determiner 219 while providing the logical address provided from the host 100 to the hotness determiner 219, and the hotness determiner 219 may provide hotness information of the logical address as a response to the request.

The allocator 231 may allocate data to the memory regions based on the hotness information of the logical address. For example, the allocator 231 may determine data corresponding to the logical address as hot data when the hotness of the logical address exceeds a first threshold value, determine data corresponding to the logical address as warm data when the hotness of the logical address is equal to or less than the first threshold value and exceeds a second threshold value, and determine data corresponding to the logical address as cold data when the hotness of the logical address is equal to or less than the second threshold value. The allocator 231 may store the hot data in the first memory region, the warm data in the second memory region, and store the cold data in the third memory region.

The migrator 232 may migrate data stored in the memory region to another memory region in order to secure extra space within the memory region. The migrator 232 may migrate data stored in the first memory region to the second memory region and the third memory region to secure extra space within the first memory region. In addition, the migrator 232 may migrate data stored in the second memory region to the third memory region in order to secure extra space within the second memory region. The migrator 232 may determine a source block and a destination block for migrating data between the memory regions.

The block manager 233 may manage memory blocks included in the memory regions. For example, the block manager 233 may update metadata related to each of the memory blocks.

The buffer memory 216 may buffer the data received from the host before the data is stored in the memory region, and may buffer data loaded from the source block in a process of migrating the data. In addition, the buffer memory 216 may store metadata for each memory block. The metadata may be referred to in order to select candidate blocks of the source block.

A method of migrating data between memory regions by the storage device according to example embodiments will hereinafter be described in more detail with reference to FIGS. 8 to 12.

Figure 8:
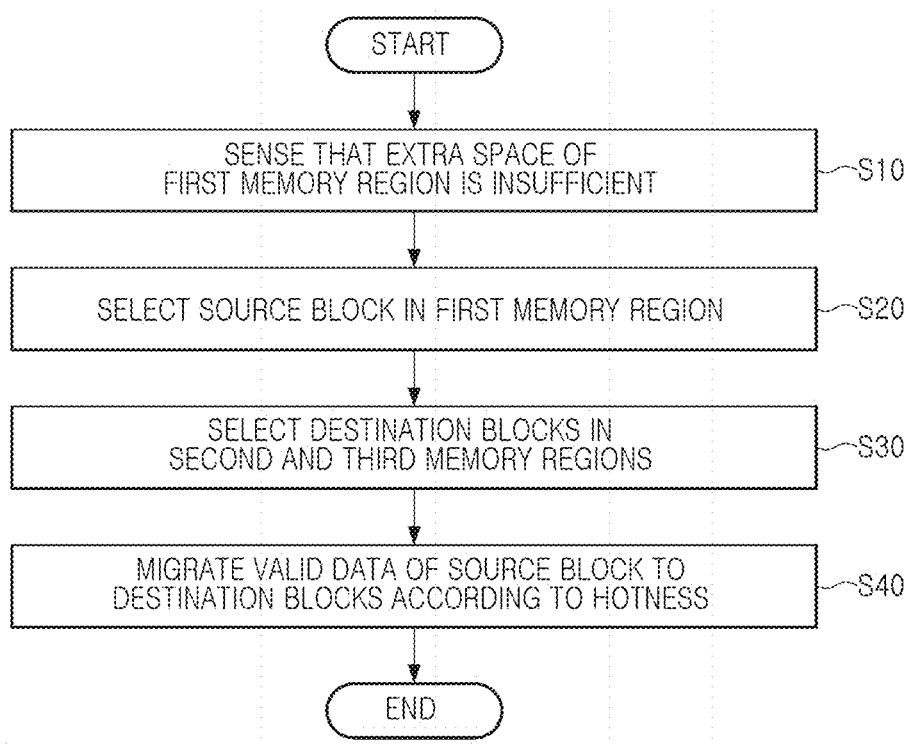
FIG. 8 is a schematic flowchart illustrating an operation of migrating data between memory regions by the storage device according to example embodiments.

FIG. 8 is a schematic flowchart illustrating an operation of migrating data between memory regions by the storage device according to example embodiments.

In S10, the storage device may sense that the extra space of the first memory region is insufficient. For example, when a size of valid data stored in the first memory region is equal to or greater than a predetermined or alternatively, desired size, the storage device may determine that the extra space of the first memory region is insufficient.

For example, the non-volatile memory may have a limitation that an overwrite operation is not supported and minimum units of a programming operation and an erase operation are different from each other. In order to compensate for such a limitation, the previously stored data may be determined as invalid data and valid data may be stored in another region, when the data stored in the memory block is updated. The storage device may manage a valid page count (VPC) for each memory block using the block manager or the like as described with reference to FIG. 5, and may determine the size of the valid data in the memory region based on the VPC for each memory block.

In S20, the storage device may select a source block in the first memory region. An operation of S20 will be described later with reference to FIGS. 9 to 10.

In S30, the storage device may select destination blocks in the second and third memory regions. An operation of S30 will be described later with reference to FIG. 11.

In S40, the storage device may divide valid data of the source block according to hotness and migrate the valid data to the destination blocks. An operation of S40 will be described later with reference to FIG. 12.

A method of determining a source block by the storage device according to example embodiments will be described in detail with reference to FIGS. 9 and 10.

Figure 9:
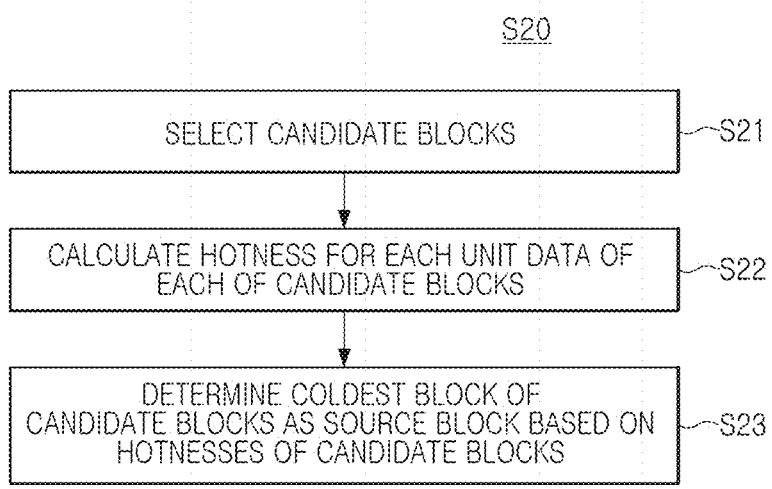
FIGS. 9 and 10 are a flowchart and a diagram illustrating, in detail, a method of determining a source block by the storage device according to example embodiments.

FIG. 9 is a flowchart illustrating detailed operations of S20 of FIG. 8.

In S21, the storage device may select candidate blocks in the first memory region. As a first example, the storage device may select K memory blocks (K is a natural number) having the lowest VPC among the first memory blocks as the candidate blocks. As a second example, the storage device may select the oldest K memory blocks that have been programmed among the first memory blocks as the candidate blocks.

In S22, the storage device may calculate a hotness for each piece of unit data of each of the candidate blocks. As described with reference to FIG. 6, each of the memory blocks may store plural pieces of unit data. Each piece of the unit data may correspond to the logical address. The storage device may determine the hotness for each logical address as described with reference to FIG. 7.

In S23, the storage device may determine the coldest block of the candidate blocks as the source block based on the hotnesses of the candidate blocks.

Figure 10:
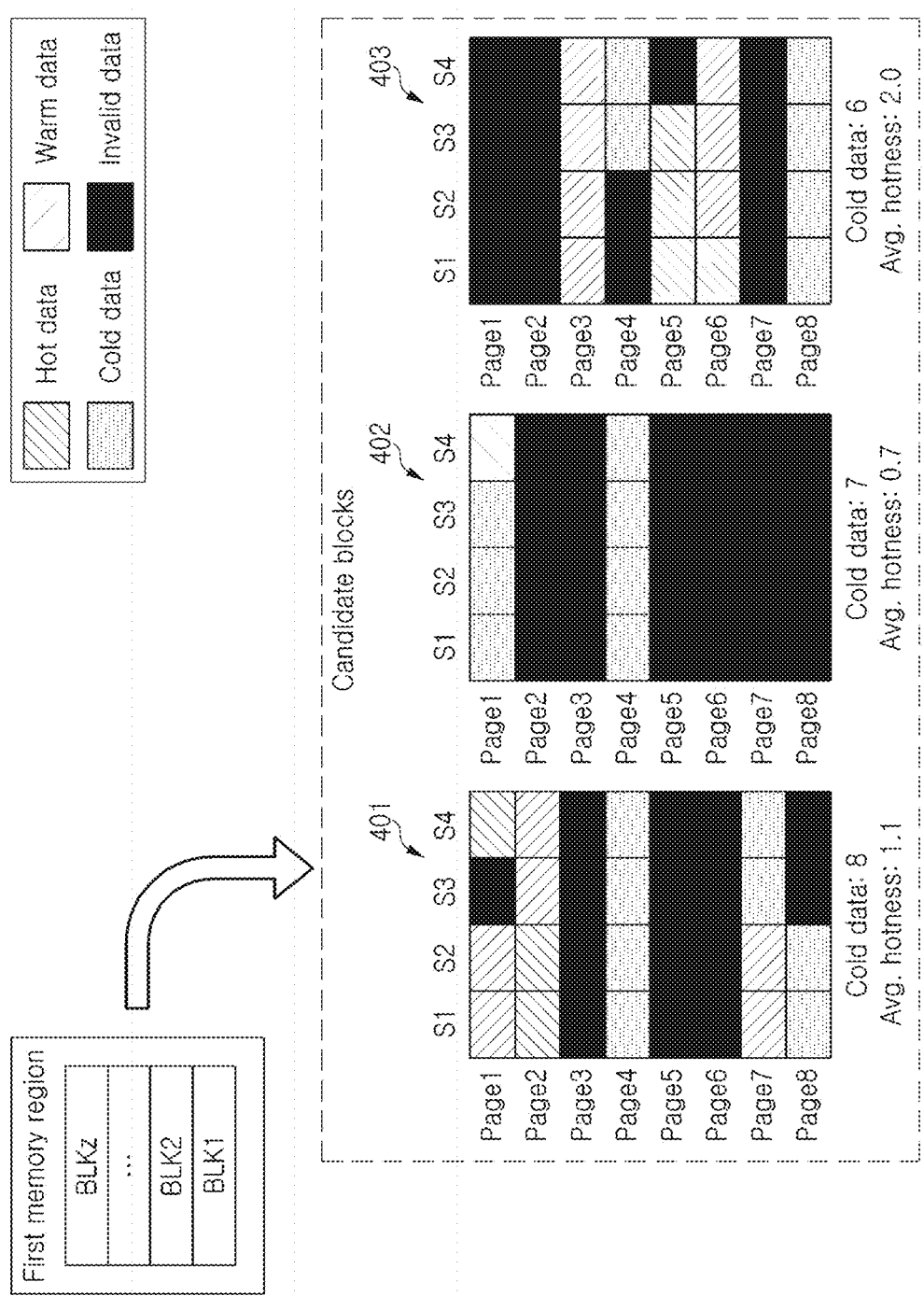

FIG. 10 is a diagram illustrating in more detail a method of determining a source block of candidate blocks.

FIG. 10 illustrates candidate blocks 401, 402, and 403 selected among first memory blocks BLK1 to BLKz included in the first memory region.

The data from the host may be stored in the first memory region when it is determined as hot data. That is, at that time when plural pieces of unit data stored in the first memory block are programmed, all of the plural pieces of unit data may be hot data. The hotness of the data may change over time. Accordingly, when a time elapses since the data has been programmed in the first memory block, some pieces of the unit data stored in the first memory block may become warm data or cold data. In addition, existing data programmed in the first memory block may also become invalid data. FIG. 10 illustrates a state in which hot data, warm data, cold data, and invalid data are mixed with each other in each of the candidate blocks 401, 402, and 403.

According to example embodiments, the storage device may determine the coldest block of the candidate blocks as the source block.

As a first example, a block in which the number of pieces of unit data determined as the cold data is the largest among the candidate blocks may be determined as the coldest block. As described with reference to FIG. 5, data of which the hotness is equal to or less than the predetermined or alternatively, desired threshold value may be determined as the cold data. For example, when the numbers of pieces of unit data corresponding to the cold data in the candidate blocks 401, 402, and 403 are 8, 7, and 6, respectively, the storage device may determine a first candidate block 401 as the source block.

As a second example, a block in which an average hotness of the each piece of unit data is the lowest among the candidate blocks may be determined as the coldest block. As described with reference to FIG. 7, the hotness may be determined for each logical address corresponding to each piece of the unit data. The average hotness may be determined based on hotnesses of all valid data among the hot data, the warm data, and the cold data of each of the candidate blocks. In an example of FIG. 10, when average hotnesses of candidate blocks 401, 402, and 403 are 1.1, 0.7, and 2.0, respectively, the storage device may determine a second candidate block 402 as the source block.

Figure 11:
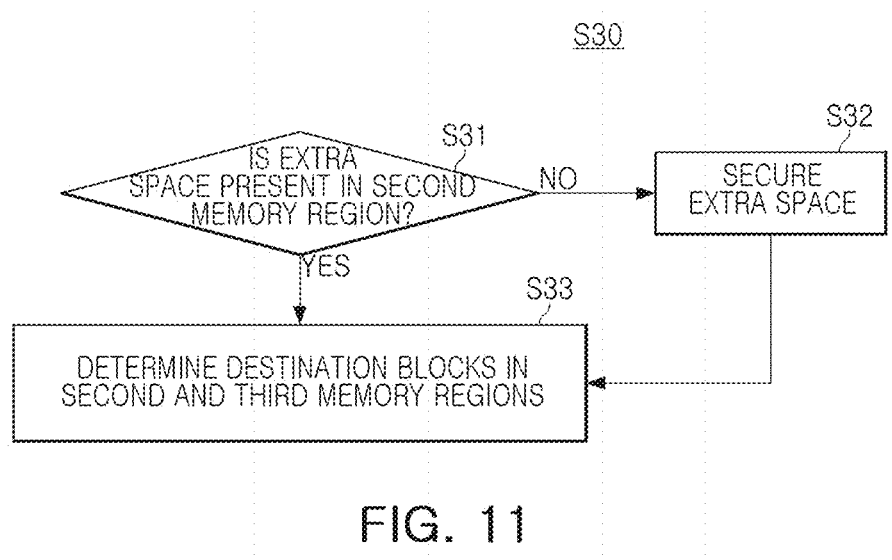
FIG. 11 is a flowchart illustrating, in detail, a method of determining a destination block by the storage device according to example embodiments.

FIG. 11 is a flowchart illustrating, in detail, a method of determining a destination block by the storage device according to example embodiments. FIG. 11 is a flowchart illustrating detailed operations of S30 of FIG. 8.

In S31, the storage device may determine whether or not there is an extra space in the second memory region. For example, the storage device may determine whether or not a size of valid data stored in the second memory region exceeds a threshold value based on the VPC for each memory block.

When the extra space in the second memory region is insufficient ("NO" in S31), the storage device may secure the extra space in the second memory region in S32. For example, the storage device may select a source block of the second memory blocks included in the second memory region, select a destination block in the third memory region, and migrate valid data stored in the source block selected in the second memory region to the destination block selected in the third memory region.

When the extra space in the second memory region is sufficient ("YES" in S31), the storage device may select destination blocks in the second and third memory regions in S33. For example, the storage device may select open blocks in the second and third memory regions as the destination blocks. The open block may refer to a memory block selected in order to program data at a current point in time.

Figure 12:
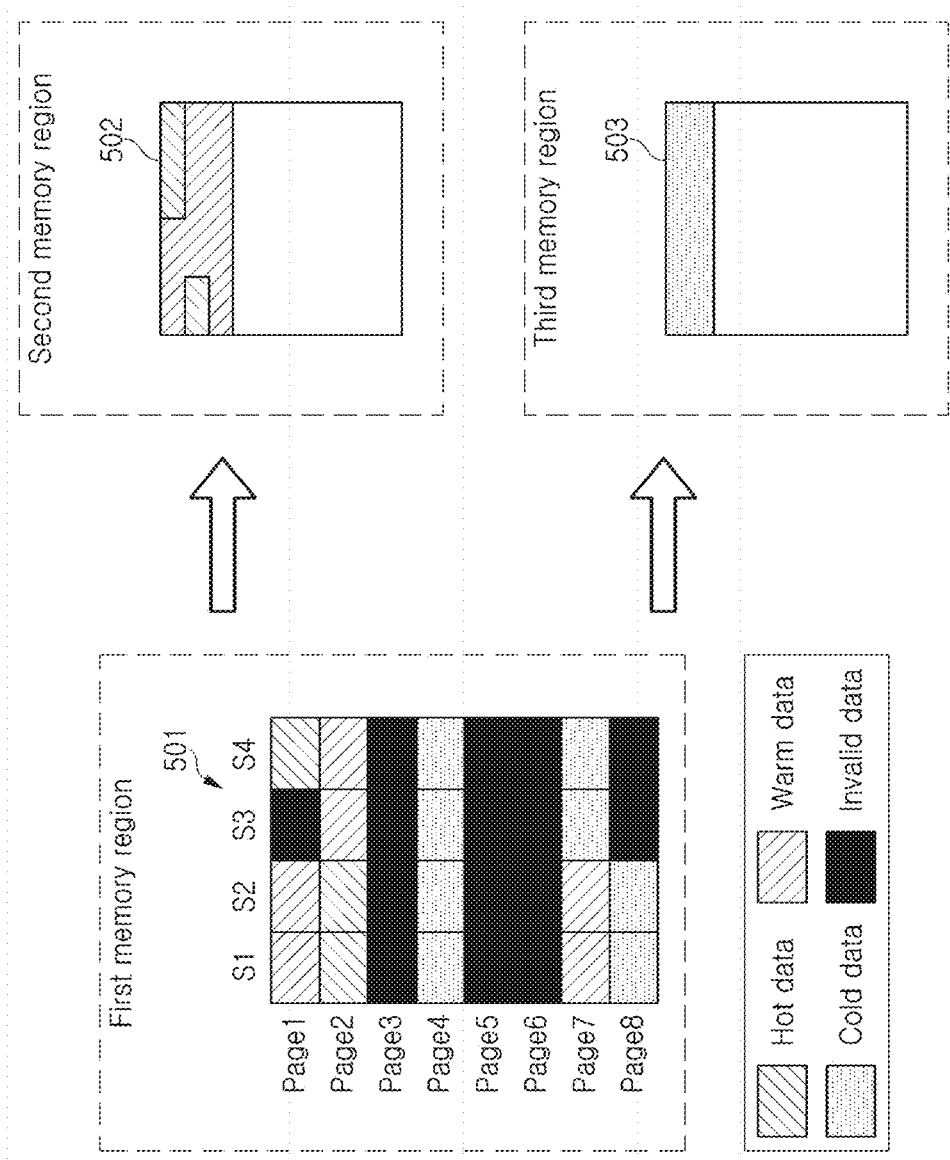
FIG. 12 is a diagram illustrating, in detail, a method of migrating data of a source block to a destination block by the storage device according to example embodiments.

FIG. 12 is a diagram illustrating, in detail, a method of migrating data of a source block to a destination block by the storage device according to example embodiments.

FIG. 12 illustrates a source block 501 selected in the first memory region and destination blocks 502 and 503 selected in the second and third memory regions.

As described with reference to FIG. 10, the source block 501 may include valid data and invalid data, and the valid data may include hot data, warm data, and cold data. According to example embodiments, the storage device may divide valid data stored in the source block 501 according to a hotness and store the divided valid data in the destination blocks 502 and 503 included in different memory regions.

In an example of FIG. 12, the storage device may migrate hot data and warm data of the source block 501 to the destination block 502 of the second memory region, and migrate cold data of the source block 501 to the destination block 503 of the third memory region. That is, the storage device may divide data to be stored in the destination blocks 502 and 503 on the basis of the second threshold value illustrated in FIG. 5. However, example embodiments are not limited thereto, and the storage device may divide and store the data of the source block 501 in the destination blocks 502 and 503 on the basis of a threshold value different from the first and second threshold values illustrated in FIG. 5.

According to example embodiments, the storage device may divide the data of the source block selected in the first memory region according to the hotness and migrate the divided data to a plurality of memory regions, instead of migrating the data of the source block selected in the first memory region to one memory region.

According to example embodiments, the data may be divided and stored in the first to third memory regions according to the hotness by selecting a block including many cold data as the source block at the time of selecting the source block. In some example embodiments, the storage device may first select the candidate blocks based on a VPC or a programmed time of the memory block and consider only hotnesses of plural pieces of unit data of each of the candidate blocks, instead of considering hotnesses of plural pieces of unit data of each of all memory blocks of the memory region in order to select the source block in the memory region. Accordingly, the storage device may decrease a computation amount for selecting the source block.

According to example embodiments, the storage device may divide and store the hot data, the warm data, and the cold data mixed with each other in the first memory region in the second and third memory regions when migrating the data in order to secure the extra space in the first memory region. Accordingly, a decrease in lifespan of the storage device may be alleviated.

Figure 13:
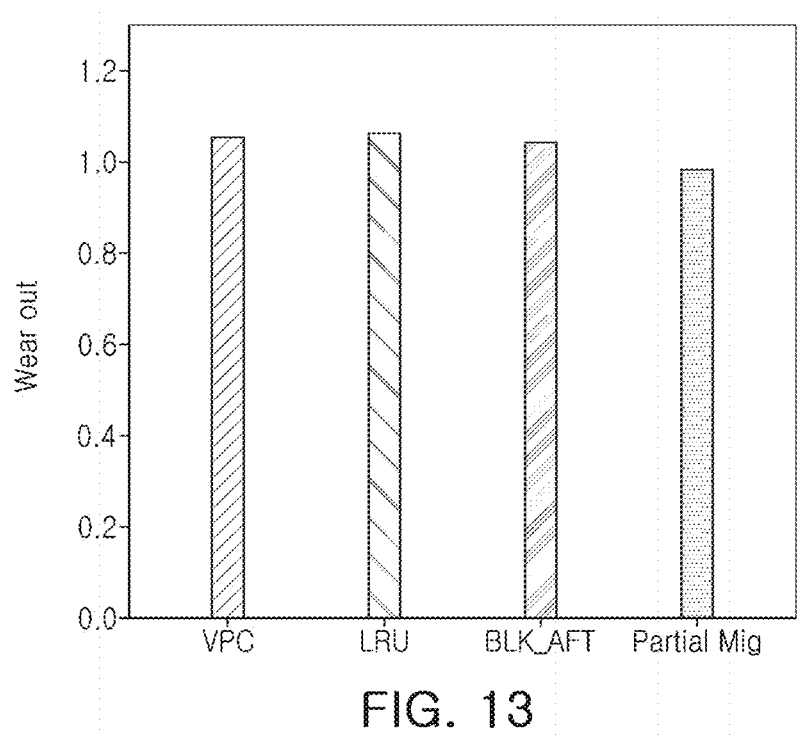
FIG. 13 is graphs illustrating an effect of example embodiments.

FIG. 13 is graphs illustrating an effect of example embodiments.

For example, FIG. 13 illustrates a decrease degree of a lifespan of a storage device including SLC, TLC, and QLC memory regions as a result of testing the storage device using test workload pattern.

In FIG. 13, a lifespan decrease degree is indicated by a wear-out on a vertical axis. The wear-out of FIG. 13 may be a standardized value of an entire lifespan decrease degree of the storage device including the SLC, TLC, and QLC memory regions having different lifespans. For example, the wear-out may be determined as the sum of current erase counts compared to limit erase counts of each of the SLC, TLC, and QLC memory regions.

In FIG. 13, 'VPC' and 'LRU' indicate test results according to Comparative Example differ from example embodiments. For example, 'VPC' indicates an example embodiment where a memory block having the lowest VPC in the memory region is selected as a source block, and 'LTRU' indicates an example embodiment where the oldest block that has been programmed in the memory region is selected as a source block.

In addition, 'BLK_AFT' and 'Partial Mig' indicate test results according to example embodiments. For example, 'BLK_AFT' indicates a test result when the source block is selected in the SLC region and the destination block is selected in the TLC memory region or the QLC memory region, according to example embodiments, and 'Partial Mig' indicates a test result when the source block is selected in the SLC memory region and the data stored in the source block are divided and stored in the destination blocks each selected in the TLC and QLC memory regions according to the hotness, according to example embodiments.

Referring to FIG. 13, when a memory block storing many cold data in the SLC region is selected as the source block, a decrease in the lifespan of the storage device may be alleviated compared to Comparative Example. In addition, when the data of the source block are divided and stored in the TLC memory region and the QLC memory region, the decrease in the lifespan of the storage device may be further alleviated.

A structure of a memory device to which example embodiments may be applied and an example of a system to which example embodiments may be applied will hereinafter be described with reference to FIGS. 14 to 15.

Figure 14:
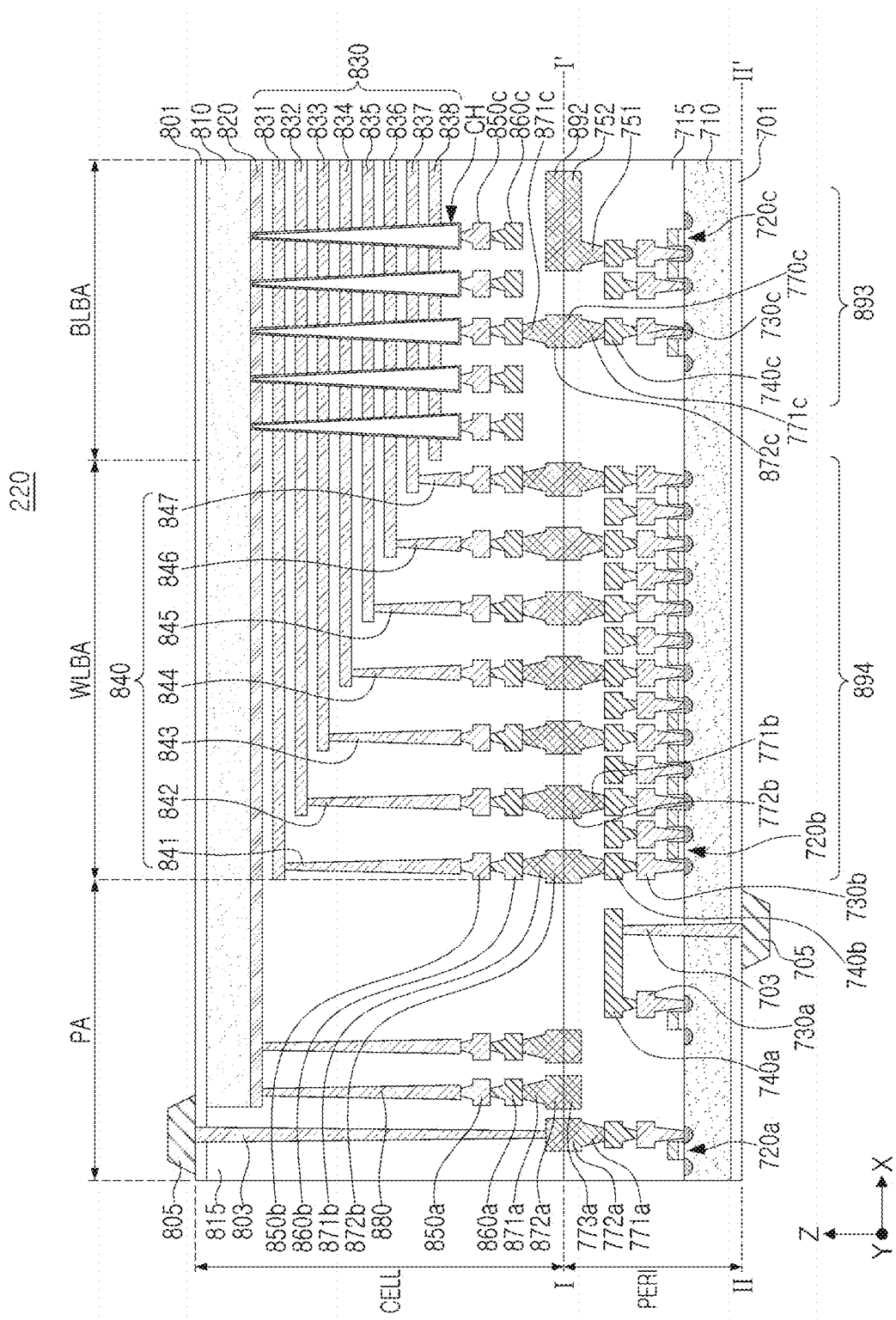
FIG. 14 is a cross-sectional view illustrating a memory device according to example embodiments.

FIG. 14 is a cross-sectional view illustrating a memory device according to example embodiments.

Referring to FIG. 14, a memory device 600 may have a chip to chip (C2C) structure. The C2C structure may refer to a structure in which an upper chip including a cell area CELL is manufactured on a first wafer, a lower chip including a peripheral circuit area PERI is manufactured on a second wafer different from the first wafer, and the upper chip and the lower chip are then connected to each other by a bonding method. As an example, the bonding method may refer to a method of electrically connecting a bonding metal formed at the uppermost metal layer of the upper chip and a bonding metal formed at the uppermost metal layer of the lower chip to each other. For example, when the bonding metal is formed of copper (Cu), the bonding method may be a Cu—Cu bonding method, and the bonding metal may also be formed of aluminum or tungsten.

Each of the peripheral circuit area PERI and the cell area CELL of the memory device 600 may include an external pad bonding area PA, a word line bonding area WLBA, and a bit line bonding area BLBA. The peripheral circuit area PERI may include a first substrate 710, an interlayer insulating layer 715, a plurality of circuit elements 720*a*, 720*b*, and 720*c* formed on the first substrate 710, first metal layers 730*a*, 730*b*, and 730*c* each connected to the plurality of circuit elements 720*a*, 720*b*, and 720*c*, and second metal layers 740*a*, 740*b*, and 740*c* formed on the first metal layers 730*a*, 730*b*, and 730*c*. In example embodiments, the first metal layers 730*a*, 730*b*, and 730*c* may be formed of tungsten having a relatively high resistance, and the second metal layers 740*a*, 740*b*, and 740*c* may be formed of copper having a relatively low resistance.

Only the first metal layers 730*a*, 730*b*, and 730*c* and the second metal layers 740*a*, 740*b*, and 740*c* are illustrated and described in the present specification, but example embodiments are not limited thereto, and one or more metal layers may also be further formed on the second metal layers 740*a*, 740*b*, and 740*c*. At least some of the one or more metal layers formed on the second metal layers 740*a*, 740*b*, and 740*c* may be formed of aluminum or the like having a lower resistance than copper forming the second metal layers 740*a*, 740*b*, and 740*c*.

The interlayer insulating layer 715 may be disposed on the first substrate 710 so as to cover the plurality of circuit elements 720*a*, 720*b*, and 720*c*, the first metal layers 730*a*, 730*b*, and 730*c*, and the second metal layer 740*a*, 740*b*, and 740*c*, and include an insulating material such as silicon oxide or silicon nitride.

Lower bonding metals 771*b* and 772*b* may be formed on the second metal layers 740*b* of the word line bonding area WLBA. In the word line bonding area WLBA, the lower bonding metals 771*b* and 772*b* of the peripheral circuit area PERI may be electrically connected to upper bonding metals 871*b* and 872*b* of the cell area CELL by a bonding method, and the lower bonding metals 771*b* and 772*b* and the upper bonding metals 871*b* and 872*b* may be formed of aluminum, copper, tungsten, or the like. The upper bonding metals 871*b* and 872*b* of the cell area CELL may be referred to as first metal pads, and the lower bonding metals 771*b* and 772*b* of the peripheral circuit area PERI may be referred to as second metal pads.

The cell area CELL may provide at least one memory block. The cell area CELL may include a second substrate 810 and a common source line 820. A plurality of word lines 830: 831 to 838 may be stacked on the second substrate 810 along a direction (Z-axis direction) perpendicular to an upper surface of the second substrate 810. String selection lines and a ground selection line may be disposed on and beneath the plurality of word lines 830, respectively, and the plurality of word lines 830 may be disposed between the string selection lines and the ground selection line.

In the bit line bonding area BLBA, channel structures CH may extend in the direction perpendicular to the upper surface of the second substrate 810 and penetrate through the word lines 830, the string selection lines, and the ground selection line. Each of the channel structures CH may include a data storage layer, a channel layer, and an embedded insulating layer, and the channel layer may be electrically connected to a first metal layer 850*c* and a second metal layer 860*c*. For example, the first metal layers 850*c* may be bit line contacts, and the second metal layers 860*c* may be bit lines. In example embodiments, the bit lines may extend in a first direction (Y-axis direction) parallel to the upper surface of the second substrate 810.

In example embodiments illustrated in FIG. 14, an area in which the channel structures CH, the bit lines and/or the like are disposed may be defined as the bit line bonding area BLBA. The bit lines may be electrically connected to the circuit elements 720*c* providing a page buffer 893 in the peripheral circuit area PERI in the bit line bonding area BLBA. As an example, the bit lines may be connected to upper bonding metals 871*c* and 872*c* in the peripheral circuit area PERI, and the upper bonding metals 871*c* and 872*c* may be connected to lower bonding metals 771*c* and 772*c* connected to the circuit elements 720*c* of the page buffer 893.

In the word line bonding area WLBA, the word lines 830 may extend in a second direction (X-axis direction) parallel to the upper surface of the second substrate 810, and may be connected to a plurality of cell contact plugs 840: 841 to 847. The word lines 830 and the cell contact plugs 840 may be connected to each other at pads provided by extending at least some of the word lines 830 at different lengths along the second direction (X-axis direction). First metal layers 850*b* and second metal layers 860*b* may be sequentially connected to upper portions of the cell contact plugs 840 connected to the word lines 830. The cell contact plugs 840 may be connected to the peripheral circuit area PERI through the upper bonding metals 871*b* and 872*b* of the cell area CELL and the lower bonding metals 771*b* and 772*b* of the peripheral circuit area PERI in the word line bonding area WLBA.

The cell contact plugs 840 may be electrically connected to circuit elements 720*b* providing a row decoder 894 in the peripheral circuit area PERI. In example embodiments, an operating voltage of the circuit elements 720*b* providing the row decoder 894 may be different from an operating voltage of the circuit elements 720*c* providing the page buffer 893. For example, the operating voltage of the circuit elements 720*c* providing the page buffer 893 may be greater than the operating voltage of the circuit elements 720*b* providing the row decoder 894.

Common source line contact plugs 880 may be disposed in the external pad bonding area PA. The common source line contact plugs 880 may be formed of a conductive material such as a metal, a metal compound, or polysilicon, and may be electrically connected to the common source line 820. A first metal layer 850*a* and a second metal layer 860*a* may be sequentially stacked on the common source line contact plug 880. As an example, an area in which the common source line contact plugs 880, the first metal layers 850*a*, and the second metal layers 860*a* are disposed may be defined as the external pad bonding area PA.

Input/output pads 705 and 805 may be disposed in the external pad bonding area PA. Referring to FIG. 14, a lower insulating film 701 covering a lower surface of the first substrate 710 may be formed beneath the first substrate 710, and a first input/output pad 705 may be formed on the lower insulating film 701. The first input/output pad 705 may be connected to at least one of the plurality of circuit elements 720*a*, 720*b*, and 720*c* disposed in the peripheral circuit area PERI through a first input/output contact plug 703, and be separated from the first substrate 710 by the lower insulating film 701. In addition, a side insulating film may be disposed between the first input/output contact plug 703 and the first substrate 710 to electrically separate the first input/output contact plug 703 from the first substrate 710.

Referring to FIG. 14, an upper insulating film 801 covering an upper surface of the second substrate 810 may be formed on the second substrate 810, and a second input/output pad 805 may be disposed on the upper insulating film 801. The second input/output pad 805 may be connected to at least one of the plurality of circuit elements 720a, 720b, and 720c disposed in the peripheral circuit area PDRI through a second input/output contact plug 803.

According to example embodiments, the second substrate 810, the common source plate 820 and/or the like may not be disposed in an area in which the second input/output contact plug 803 is disposed. In addition, the second input/output pad 805 may not overlap the word lines 830 in a third direction (Z-axis direction). Referring to FIG. 14, the second input/output contact plug 803 may be separated from the second substrate 810 in a direction parallel to the upper surface of the second substrate 810, and may penetrate through an interlayer insulating layer 815 of the cell area CELL and be connected to the second input/output pad 805.

According to example embodiments, the first input/output pad 705 and the second input/output pad 805 may be optionally formed. As an example, the memory device 600 may include only the first input/output pad 705 disposed on the first substrate 710 or include only the second input/output pad 805 disposed on the second substrate 810. Alternatively, the memory device 600 may include both the first input/output pad 705 and the second input/output pad 805.

In each of the external pad bonding area PA and the bit line bonding area BLBA included in each of the cell area CELL and the peripheral circuit area PERI, a metal pattern of the uppermost metal layer may exist as a dummy pattern or the uppermost metal layer may be empty.

In the memory device 600, in the external pad bonding area PA, lower metal patterns 773a having the same shape as upper bonding metals 872a of the cell area CELL may be formed at the uppermost metal layer of the peripheral circuit area PERI so as to correspond to the upper bonding metals 872a formed at the uppermost metal layer of the cell area CELL. The lower metal patterns 773a formed at the uppermost metal layer of the peripheral circuit area PERI may not be connected to separate contacts in the peripheral circuit area PERI. Similarly, in the external pad bonding area PA, upper metal patterns having the same shape as the lower metal patterns of the peripheral circuit area PERI may be formed at the uppermost metal layer of the cell area CELL so as to correspond to the lower metal patterns formed at the uppermost metal layer of the peripheral circuit area PERI.

The lower bonding metals 771b and 772b may be formed on the second metal layers 740b of the word line bonding area WLBA. In the word line bonding area WLBA, the lower bonding metals 771b and 772b of the peripheral circuit area PERI may be electrically connected to the upper bonding metals 871b and 872b of the cell area CELL by a bonding method.

In addition, in the bit line bonding area BLBA, an upper metal pattern 892 having the same shape as a lower metal pattern 752 of the peripheral circuit area PERI may be formed at the uppermost metal layer of the cell area CELL so as to correspond to the lower metal pattern 752 formed at the uppermost metal layer of the peripheral circuit area PERI. In example embodiments, a contact may not be formed on the upper metal pattern 892 formed at the uppermost metal layer of the cell area CELL.

In example embodiments, a reinforced metal pattern having the same cross-sectional shape as a metal pattern may be formed at the uppermost metal layer of the other of the cell area CELL and the peripheral circuit area PERI so as to correspond to the metal pattern formed at the uppermost metal layer of one of the cell area CELL and the peripheral circuit area PERI. A contact may not be formed on the reinforced metal pattern.

The memory device 600 may include memory blocks having different bit densities according to the numbers of bits stored in the memory cells. According to example embodiments, when data migration between memory regions is performed, data may be divided and stored according to attributes, such that a lifespan of the memory device 600 may be improved and an average access speed may be improved.

Figure 15:
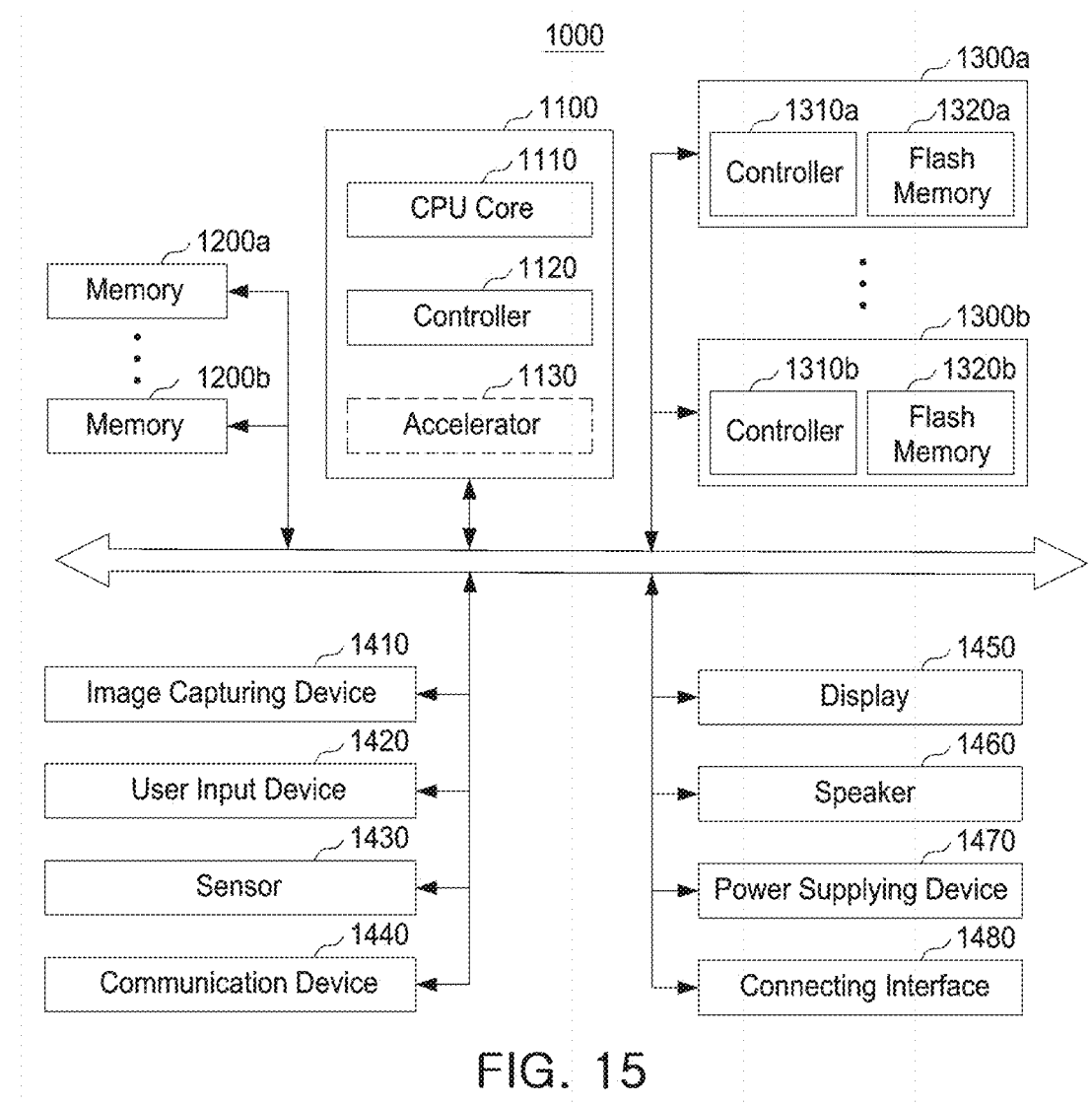
FIG. 15 is a block diagram illustrating a system to which the storage device according to example embodiments is applied.

FIG. 15 is a block diagram illustrating a system 1000 to which the storage device according to example embodiments is applied. The system 1000 of FIG. 15 may be basically a mobile system such as a mobile phone, a smartphone, a tablet personal computer (PC), a wearable device, a healthcare device, or an Internet of things (IOT) device. However, the system 1000 of FIG. 15 is not necessarily limited to the mobile system, and may be a personal computer, a laptop computer, a server, a media player, an automotive device such as a navigation device, or the like.

Referring to FIG. 15, the system 1000 may include a main processor 1100, memories 1200a and 1200b, and/or storage devices 1300a and 1300b, and may further include one or more of an image capturing device 1410, a user input device 1420, a sensor 1430, a communication device 1440, a display 1450, a speaker 1460, a power supplying device 1470, and/or a connecting interface 1480.

The main processor 1100 may control a general operation of the system 1000, for example, operations of the other components constituting the system 1000. The main processor 1100 may be implemented as a general-purpose processor, a dedicated processor, an application processor, or the like.

The main processor 1100 may include one or more central processing unit (CPU) cores 1110, and may further include a controller 1120 for controlling the memories 1200a and 1200b and/or the storage devices 1300a and 1300b. According to example embodiments, the main processor 1100 may further include an accelerator 1130, which is a dedicated circuit for high-speed data operation such as artificial intelligence (AI) data operation. Such an accelerator 1130 may include a graphics processing unit (GPU), a neural processing unit (NPU), a data processing unit (DPU), and/or the like, and may also be implemented as a separate chip physically independent from the other components of the main processor 1100.

The memories 1200a and 1200b may be used as main memory units of the system 1000, and may include volatile memories such as a static random access memory (SRAM) and/or a dynamic random access memory (DRAM), but may also include non-volatile memories such as a flash memory, a phase change random access memory (PRAM), and/or a resistive random access memory (RRAM). The memories 1200a and 1200b may also be implemented in the same package as the main processor 1100.

The storage devices 1300a and 1300b may function as non-volatile storage devices that store data regardless of whether or not power is supplied thereto, and may have a relatively greater storage capacity than the memories 1200a and 1200b. The storage devices 1300a and 1300b may include storage controllers 1310a and 1310b and non-volatile memories (NVMs) 1320a and 1320b that store data under the control of the storage controllers 1310a and 1310b, respectively. The non-volatile memories 1320a and 1320b may include flash memories having a 2-dimensional (2D) structure or a 3-dimensional (3D) vertical negative AND (V-NAND) structure, but may also include other types of non-volatile memories such as a PRAM and/or an RRAM.

The storage devices 1300a and 1300b may be included in the system 1000 in a state in which they are physically separated from the main processor 1100 or may be implemented in the same package as the main processor 1100. In addition, the storage devices 1300a and 1300b may have a form such as a solid state device (SSD) or a memory card to be detachably coupled to the other components of the system 1000 through an interface such as a connecting interface 1480 to be described later. Such storage devices 1300a and 1300b may be devices to which a standard protocol such as universal flash storage (UFS), embedded multi-media card (eMMC), or non-volatile memory express (NVMe) is applied, but are necessarily limited thereto.

The storage devices 1300a and 1300b according to example embodiments may include memory regions having different bit densities. The storage devices 1300a and 1300b may provide high access performance and a high lifespan by not only dividing and storing data received from the host in memory regions having different bit densities according to a hotness, but also allowing data to be divided and stored according to the hotness when migrating the data between the memory regions.

The image capturing device 1410 may capture a still image or a moving image, and may be a camera, a camcorder, a webcam, or the like.

The user input device 1420 may receive various types of data input from a user of the system 1000, and may be a touch pad, a keypad, a keyboard, a mouse, a microphone, or the like.

The sensor 1430 may sense various types of physical quantities that may be obtained from the outside of the system 1000 and convert the sensed physical quantities into electrical signals. Such a sensor 1430 may be a temperature sensor, a pressure sensor, an illuminance sensor, a position sensor, an acceleration sensor, a biosensor, a gyroscope sensor, or the like.

The communication device 1440 may transmit and receive signals to and from other devices outside the system 1000 according to various communication protocols. Such a communication device 1440 may be implemented to include an antenna, a transceiver, a modem, and/or the like.

The display 1450 and the speaker 1460 may function as output devices that output visual information and auditory information to the user of the system 1000, respectively.

The power supplying device 1470 may appropriately convert power supplied from a battery (not illustrated) embedded in the system 1000 and/or an external power source and supply the converted power to respective components of the system 1000.

The connecting interface 1480 may provide a connection between the system 1000 and an external device connected to the system 1000 to be capable of transmitting and receiving data to and from the system 1000. The connecting interface 1480 may be implemented in various interface manners such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an institute of electrical and electronic engineers (IEEE) 1394, a universal serial bus (USB), a secure digital (SD) card, a multi-media card (MMC), an embedded multi-media card (eMMC), a universal flash storage (UFS), an embedded UFS (eUFS), and a compact flash (CF) card interface.

Example embodiments may provide components and operations related to a storage device of dividing and storing data having different attributes in memory regions having different bit densities.

According to example embodiments, when a source block is selected in a memory region in order to secure extra space within the memory region, the source block may be selected based on hotnesses of data stored in memory blocks.

According to example embodiments, destination blocks may be selected from two or more memory regions, and the data may be divided and stored in destination blocks of different memory regions based on hotnesses of the data stored in the source block.

According to example embodiments, data having different attributes may be divided and stored in the memory regions, and a decrease in lifespan of the memory regions may thus be alleviated.

As described herein, any devices, systems, blocks, modules, units, controllers, circuits, apparatus, and/or portions thereof according to any of some example embodiments may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and/or the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, blocks, modules, units, controllers, circuits, apparatuses, and/or portions thereof according to any of some example embodiments, and/or any portions thereof, including for example some or all operations of any of the methods shown in FIGS. 8, 9, and 11.

While example embodiments have been illustrated and described above, it will be apparent to those skilled in the art that modifications and variations could be made without departing from the scope of the present inventive concepts as defined by the appended claims.

What is claimed is:

1. A storage device comprising:
   a memory device including a first memory region having a lowest bit density, a second memory region having a medium bit density, and a third memory region having a highest bit density; and
   a controller configured to control the memory device,
   wherein the controller is configured to determine data, from a host, as being any one of hot data, warm data and cold data based on a degree of hotness of the data, is configured to store the hot data in the first memory region, is configured to store the warm data in the second memory region, is configured to store the cold data in the third memory region, is configured to select a source block of first memory blocks included in the first memory region, is configured to select destination blocks in each of the second and third memory regions, and is configured to migrate each piece of unit data stored in the source block to the destination blocks of the second or third memory regions according to a degree of hotness of each piece of the unit data, and wherein the controller is configured to determine the degree of hotness of each piece of the unit data based on reception frequencies of logical addresses corresponding to each piece of the unit data, from the host, and recency of the logical addresses.

2. The storage device of claim 1, wherein the controller is configured to migrate hot data and warm data among plural pieces of unit data stored in the source block to the second memory region, and is configured to migrate cold data among plural pieces of the unit data to the third memory region.

3. The storage device of claim 1, wherein the controller is configured to determine candidate blocks among the first memory blocks based on a valid page count (VPC) of each of the first memory blocks, and is configured to select the source block based on hotnesses of plural pieces of unit data stored in each of the candidate blocks.

4. The storage device of claim 3, wherein the controller is configured to determine a memory block in which an average hotness of plural pieces of unit data stored therein is the lowest among the candidate blocks, as the source block.

5. The storage device of claim 3, wherein the controller is configured to determine a block in which a number of pieces of cold data of which hotnesses are equal to or less than a threshold value is the largest among the candidate blocks, as the source block.

6. The storage device of claim 1, wherein the controller is configured to determine candidate blocks among the first memory blocks based on a time when data of each of the first memory blocks has been programmed, and is configured to select the source block based on hotnesses of plural pieces of unit data stored in each of the candidate blocks.

7. The storage device of claim 1, wherein the controller is configured to select a source block among second memory blocks included in the second memory region when a size of extra space within the second memory region is insufficient, is configured to select a destination block in the third memory region, and is configured to migrate plural pieces of unit data stored in the source block selected in the second memory region to the destination block selected in the third memory region.

8. The storage device of claim 1, wherein an operation of selecting the source block is performed when it is sensed that extra space within the first memory region is insufficient.

9. The storage device of claim 1, wherein the first memory region includes single level cell (SLC) memory blocks,
the second memory region includes triple level cell (TLC) memory blocks, and
the third memory region includes quadruple level cell (QLC) memory blocks.

10. A storage device comprising:
a memory device including a first memory region having a lowest bit density, a second memory region having a medium bit density, and a third memory region having a highest bit density; and
a controller configured to control the memory device,
wherein the controller is configured to divide and store data, from a host, in the first to third memory regions according to a hotness of the data, is configured to determine candidate blocks among first memory blocks included in the first memory region based on valid page counts (VPCs) or programmed times of the first memory blocks, is configured to select a source block based on hotnesses of plural pieces of unit data stored in the candidate blocks, is configured to select destination blocks in the second and third memory regions, is configured to migrate each piece of unit data stored in the source block to the destination blocks of the second or third memory regions according to a degree of hotness of each piece of the unit data, and is configured to determine the degree of hotness of each piece of the unit data based on reception frequencies of logical addresses corresponding to each piece of the unit data, from the host, and recency of the logical addresses.

11. The storage device of claim 10, wherein the controller is configured to determine a memory block in which an average hotness of plural pieces of unit data stored therein is the lowest among the candidate blocks, as the source block.

12. The storage device of claim 10, wherein the controller is configured to determine a memory block in which a number of pieces of unit data of which hotnesses are equal to or less than a threshold value is the largest among the candidate blocks, as the source block.

13. The storage device of claim 10, wherein the controller is configured to determine K memory blocks (K is a natural number) having a lowest VPC among the first memory blocks as the candidate blocks.

14. The storage device of claim 10, wherein the controller is configured to determine oldest K blocks that have been programmed among the first memory blocks as the candidate blocks.

15. The storage device of claim 10, wherein the controller is further configured to determine the data as hot data when the degree of hotness exceeds a first threshold value, is configured to determine the data as warm data when the degree of hotness is equal to or less than the first threshold value and exceeds a second threshold value, and is configured to determine the data as cold data when the degree of hotness is equal to or less than the second threshold value.

16. An operating method of a storage device including a first memory region having a lowest bit density, a second memory region having a medium bit density, and a third memory region having a highest bit density, comprising:
determining candidate blocks among first memory blocks included in the first memory region based on valid page counts (VPCs) or programmed times of the first memory blocks, the determining including determining a hotness of each piece of unit data based on reception frequencies of logical addresses corresponding to each piece of the unit data, from a host, and recency of the logical addresses;
selecting a source block based on hotnesses of plural pieces of unit data stored in the candidate blocks;
selecting destination blocks in the second and third memory regions; and migrating each piece of the unit data stored in the source block to the destination blocks of the second or third memory regions according to a degree of hotness of each piece of the unit data.

17. The operating method of claim 16, wherein the selecting of the source block including determining a memory block in which an average hotness of plural pieces of unit data stored therein is the lowest among the candidate blocks, as the source block.

18. The operating method of claim 16, wherein the selecting of the source block including determining a memory block in which a number of pieces of unit data of which hotnesses are equal to or less than a threshold value is the largest among the candidate blocks, as the source block.

19. The operating method of claim 16, wherein the migrating of each piece of the unit data stored in the source block to the destination blocks of the second or third memory regions include:
  migrating pieces of unit data having a hotness greater than a threshold value among the unit data to a destination block of the second memory region from among the destination blocks; and
  migrating pieces of unit data having a hotness equal to or less than the threshold value among plural pieces of the unit data to a destination block of the third memory region from among the destination blocks.

* * * * *